United States Patent [19]

Katcherian et al.

[11] Patent Number: 5,056,850
[45] Date of Patent: Oct. 15, 1991

[54] WINDOW REVEAL MOLDING

[75] Inventors: Ricky V. Katcherian, Northville; Donald F. Rinke, Warren; Raymond D. Price; Daniel R. Hunt, both of Troy, all of Mich.

[73] Assignee: General Motors Corporation, Detroit, Mich.

[21] Appl. No.: 653,537

[22] Filed: Feb. 11, 1991

[51] Int. Cl.⁵ .............................................. B60J 5/02
[52] U.S. Cl. ...................................... 296/93; 52/208; 296/146; 296/201; 296/202; 49/490
[58] Field of Search ................. 296/93, 201, 202, 146; 52/208; 49/475, 479, 490, 491

[56] References Cited

U.S. PATENT DOCUMENTS

| | | | |
|---|---|---|---|
| 3,155,422 | 11/1964 | Campbell et al. | 296/93 |
| 4,147,006 | 4/1979 | Kruschwitz | 52/401 |
| 4,168,858 | 9/1979 | Inamoto | 296/84 R |
| 4,304,075 | 12/1981 | Miyoshi | 52/98 |
| 4,389,069 | 6/1983 | Sengoku | 296/206 |
| 4,396,223 | 8/1983 | Drexel et al. | 296/201 |
| 4,458,459 | 7/1984 | Irrgang | 52/208 |
| 4,496,186 | 1/1985 | Tuchiya | 296/93 |
| 4,621,469 | 11/1986 | Kruschwitz | 52/208 |
| 4,653,801 | 3/1987 | Shirasu et al. | 296/93 |
| 4,758,039 | 7/1988 | Ohhazama et al. | 296/84 A |
| 4,787,187 | 11/1988 | Feldmann | 52/397 |
| 4,833,847 | 5/1989 | Inayama et al. | 52/208 |

Primary Examiner—Robert R. Song
Attorney, Agent, or Firm—Raymond I. Bruttomesso, Jr.

[57] ABSTRACT

A motor vehicle molding assembly for concealing the space between the edges of a window panel and a door which are mounted to a pillar. The molding assembly has a retainer mounted to the pillar. The retainer has a first projection projecting generally perpendicular to the pillar, with a hook formed at the end of the first projection. A dual durometer molding has a rigid portion having a groove with a catch portion adapted to receive and engage the hook of the retainer to secure the molding to the door pillar. A pliable portion encases the rigid portion and has a pair of legs depending towards and engaging the retainer mounted to the pillar for biasing the dual durometer molding away from the retainer and maintaining the engagement of the hook with the catch portion. A continuous flexible lip is extruded integral with the pliable portion and bridges across the top of the legs and the interposed rigid portion. The lip has a window engaging portion overlying the edge of the window and a door engaging portion underlying the door whereby the dual durometer molding bridges across the space between the window panel and the door.

2 Claims, 1 Drawing Sheet

WINDOW REVEAL MOLDING

This invention relates to a fixed glass molding and more particularly to a molding assembly for closing out the space between the fixed window panel and the door.

BACKGROUND OF THE INVENTION

It is known to have pillars supporting the roof and giving structural support to the motor vehicle. The pillars define door openings and window openings such as for the windshield. It is also known to have the fixed window panel and the door overlie the pillar so that the pillar is hidden from view from the exterior of the car. A molding fills the space between the window panel and the door to seal the vehicle from weather and wind noise and make the vehicle more aesthetically pleasing.

It is also known to mount the molding to the vehicle pillar by screws or by a plurality of clips spaced along the length of the molding. The clips engage studs welded to the pillar of the frame. A shortcoming of these methods is the requirement of numerous fasteners. In addition these methods can result in lack of consistency in placement of the molding relative to the pillar since the molding inboard or outboard position is dependent on the amount of force used to install the molding on the clips.

It is also known to mount the molding to the window panel and then mount the window panel and molding assembly to the vehicle by an adhesive. A shortcoming of this method is that the location of the molding is dependent on where the window and molding are positioned with respect to the window opening and how much force is used to insert the window and molding into the adhesive surrounding the window opening.

It would be desirable to have a molding that mounts to a retainer which is welded to the pillar whereby the location of the molding is consistent and is not related to the amount of force used in installing the molding.

SUMMARY OF THE INVENTION

This invention provides a molding assembly for concealing the space between the edge of a window panel and a door hingedly mounted to a pillar of a motor vehicle, where a front face of the pillar underlies the window panel. The molding assembly has a retainer mounted to the front face of the door pillar. The retainer has a first projection projecting generally perpendicular to the front face of the door pillar, with a hook formed at the end of the first projection. A second projection of the retainer is generally parallel with the front face and projects towards the door. An auxiliary seal mounts to the second projection and abuts the door. A dual durometer molding has a rigid portion having a groove with a catch portion adapted to receive and engage the hook of the retainer to secure the molding to the door pillar. A pliable portion encases the rigid portion and has a pair of legs depending towards and engaging the retainer mounted to the pillar for biasing the dual durometer molding away from the retainer and maintaining the engagement of the hook with the catch portion. A continuous flexible lip is extruded integral with the pliable portion and bridges across the top of the legs and the interposed rigid portion. The flexible lip has a window engaging portion overlying the edge of the window and a door engaging portion underlying the door whereby the dual durometer molding bridges across the space between the window panel and the door.

One object, feature and advantage resides in the provision of a dual durometer molding having a hook to receive a catch portion of the retainer for retaining and aligning the dual durometer molding relative to the window panel and the door.

Another object, feature and advantage resides in the provision of a pair of legs on the dual durometer molding for projecting toward and engaging with the retainer for biasing the dual durometer molding away from the pillar so that the dual durometer molding is consistently properly located.

Further objects, features and advantages of the present invention will become more apparent to those skilled in the art as the nature of the invention is better understood from the accompanying drawings and detailed description.

DESCRIPTION OF THE PREFERRED EMBODIMENT

Figures 1, 2:
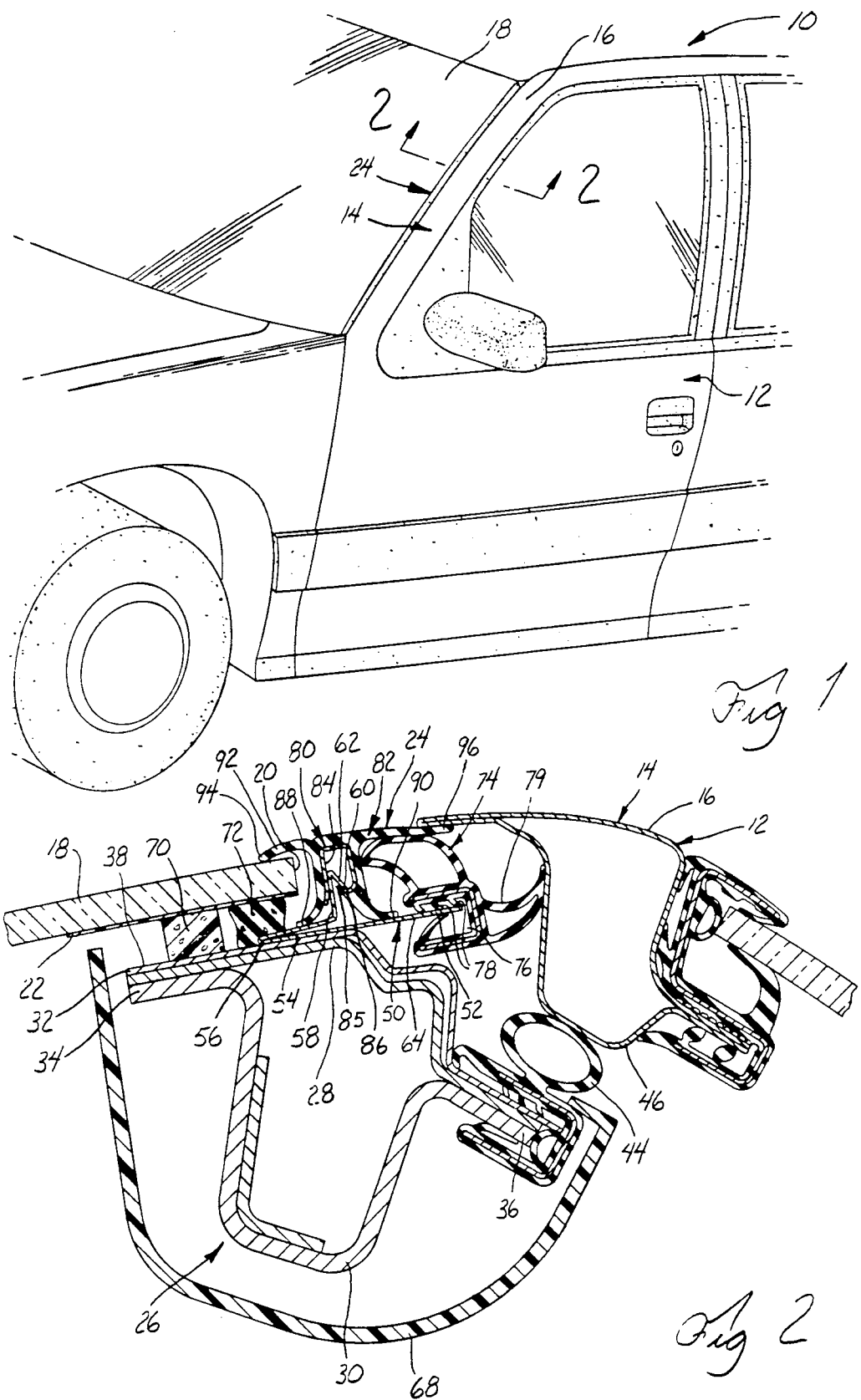
FIG. 1 is a perspective view of a vehicle having a window molding according to the invention.
FIG. 2 is a cross-sectional view taken in the direction of arrows 2—2 of FIG. 1.

Referring to FIG. 1, it is seen that a vehicle body 10 has a door 12 including a front portion 14 of a side window door frame 16 which wraps around towards an edge 20 of a window or windshield 18. A dual durometer molding 24 closes out a space between the windshield 18 and the door 12 as seen in FIG. 2 and extends the height of the windshield 18 from a lower reveal molding to an upper reveal molding.

Referring to FIG. 2, a pillar 26, which is hidden from view from the exterior of vehicle, is composed of a roof outer frame 28, a bodyside door opening frame 30 and an inner frame 32. The frames 28, 30 and 32 are spot welded together at an inner extending wall 34 which is parallel with a front face 38 of the pillar 26 and at an outer extending wall 36 which projects towards the door 12. The front face 38 of the pillar underlies a portion of the windshield 18. A primary seal 44 mounts to the outer extending wall 36 of the pillar 26 and engages an inner panel 46 of the door 12 when the door 12 is closed.

A retainer 50 made of rigid rolled steel has a base 54 securely mounted by spot welds or other suitable means to the front face 38 of the pillar 26. A first end 52 of the base 54 of the retainer 50 projects towards the door 12. At the other end of the base 54 is a reverse bend 56 causing the retainer 50 to head back and overlie a portion of the base 54. The retainer 50 has a first projection 58 which projects generally perpendicular to the front face 38 of the pillar 26. The retainer 50 has a reverse bend from the first projection 58 which defines a hook 62 which projects towards the base 54 and terminates in a second end 60.

The first end 52 of the retainer 50 defines a second projection 64 which is enveloped by an auxiliary weather-strip seal 74. The auxiliary weather-strip seal 74 has a channel 76 with a series of legs 78 projecting into the channel 76 and engaging the second projection 64. The auxiliary weather-strip seal 74 engages and abuts the frame 16 of the door 12.

Referring to FIG. 2, a foam spacer 70 secured to the front face 38 of the pillar 26 spaces the windshield 18 from the pillar 26. A urethane adhesive 72 secures the windshield 18 to the pillar 26. The windshield 18 has a black coating 22 which prevents the foam spacer 70 and the urethane adhesive 72 from being seen from the exterior of the vehicle 10.

An interior trim 68 is mounted to the pillar 26 by a series of clips, not shown, to hide the pillar 26 from view from the interior of the vehicle 10.

Referring to FIG. 2, the dual durometer molding 24 has a rigid portion 80 made of a rigid polyvinyl chloride and a pliable portion 82 made of a flexible polyvinyl chloride. The rigid portion 80 is formed with a groove 84. An edge 85 of the rigid portion 80 juts into the groove 84 forming a catch portion 86 adapted to receive and engage the hook 62 of the retainer 50 securing the molding 24 to the pillar 26. The pliable portion 82 encases the rigid portion 80 and has a pair of legs 88 and 90 which straddle the rigid portion 80 and the first projection 58 and depending towards and engage the retainer 50. The legs 88 and 90 engaging the retainer 50 are splayed away from each other and bias the dual durometer molding 24 away from the retainer 50 and thereby continuously urge the hook 62 into engagement with the catch portion 86.

A continuous flexible lip 92 extruded integral with the pliable portion 82 bridges across the top of the legs 88 and 90 and the interposed rigid portion 80. The lip 92 has a windshield engaging portion 94 overlying the windshield 18 forming a seal along the edge 20 of the windshield 18 and a door engaging portion 96 underlying an edge of the door 12 thereby bridging across the space between the windshield 18 and the door 12.

A sealing bubble 79 of the auxiliary weather-strip seal 74 underlies and engages the door engaging portion 96 of the continuous flexible lip 92.

During vehicle assembly, the pillar 26 of the vehicle 10 is first assembled. The retainer 50 is then spot welded to the pillar 26 and the doors mounted to the pillars 26 prior to painting. The urethane adhesive and the foam spacer 70 is applied to the pillar 26 after painting. The windshield 18 is aligned on the vehicle 10; the first projection 58 of the retainer 50 can be used as a rough guide for positioning the windshield 18. The windshield 18 is secured to the vehicle 10 using the urethane adhesive 72.

The primary seal 44 is installed on the outer extending wall 36 of the pillar 26. Likewise, the auxiliary weather-strip seal 74 is installed on the second projection 64 of the retainer 50.

The dual durometer molding 24 is then placed on the vehicle 10 by pushing the groove 84 of the rigid portion 80 over the first projection 58 of the retainer 50. The rigid portion 80 of molding 24 flexes allowing the hook 62 to enter the groove 84. The molding 24 then finds a normal position with the hook 62 received by the catch portion 86. The legs 88 and 90 on the pliable portion 82 engage the retainer 50 and bias the dual durometer molding 24 away from the retainer 50 ensuring that the catch portion 86 of the dual durometer molding 24 securely engages the hook 62 and the molding 24 is properly aligned. The legs 88 and 90 are splayed outwardly in a wide apart stance which prevents the dual durometer molding 24 from rotating due to the force which the door 12 imposes on the door engaging portion 96 during opening and closing of the door 12.

Thus it is seen that the dual durometer molding 24 is snapped to the retainer 50 independent of the mounted location of the windshield 18. The legs 88 and 90 bias the dual durometer molding 24 away from the retainer 50 to insure the proper position of the molding 24, and also prevent the molding 24 from rotating.

While an embodiment of the present invention has been explained, various modifications within the spirit and scope of the following claims will be readily apparent to those skilled in the art.

The embodiments of the invention in which an exclusive property or privilege is claimed are defined as follows:

1. A motor vehicle molding assembly for concealing the space between the edges of a window panel and a door which are mounted to a pillar, the molding assembly comprising:

a retainer mounted to the pillar and having a first projection means projecting generally perpendicular to the pillar, with a hook means formed at the end of the projection means; and a dual durometer molding including a rigid portion having a groove with a catch portion adapted to receive and engage the hook means of the retainer to secure the molding to the door pillar, a pliable portion encasing the rigid portion and having a pair of legs depending towards and engaging the retainer mounted to the pillar for biasing the dual durometer molding away from the retainer and maintaining the engagement of the hook means with the catch portion, and a continuous flexible lip extruded integral with the pliable portion and bridges across the top of the legs and the interposed rigid portion, and the lip having a window engaging portion overlying the edge of the window and a door engaging portion underlying the door whereby the dual durometer molding bridges across the space between the window panel and the door.

2. A motor vehicle molding assembly for concealing the space between an edge of a window panel and a door hingedly mounted to a pillar, where a front face of the pillar underlies the window panel, the molding assembly comprising:

a retainer mounted to the front face of the door pillar and having a first projection means projecting generally perpendicular to the front face of the door pillar, with a hook means formed at the end of the first projection means, and a second projection means generally parallel with the front face and projecting towards the door;

an auxiliary seal mounted to the second projection means and abutting the door; and a dual durometer molding comprising a rigid portion having a groove with a catch portion adapted to receive and engage the hook means of the retainer to secure the molding to the door pillar, a pliable portion encasing the rigid portion and having a pair of legs depending towards and engaging the retainer mounted to the pillar for biasing the dual durometer molding away from the retainer and maintaining the engagement of the hook means with the catch portion, and a continuous flexible lip extruded integral with the pliable portion and bridging across the top of the legs and the interposed rigid portion, and the lip having a window engaging portion overlying the edge of the window and a door engaging portion underlying the door whereby the dual durometer molding bridges across the space between the window panel and the door.

* * * * *